United States Patent [19]

Sekimoto et al.

[11] Patent Number: 4,614,601

[45] Date of Patent: Sep. 30, 1986

[54] COMPLETION AND WORKOVER FLUIDS

[75] Inventors: Yukihiko Sekimoto, Saitama; Makoto Yanagida, Tokyo; Shoichi Kanda, Kanagawa, all of Japan

[73] Assignee: Nitto Chemical Industry Co., Ltd., Tokyo, Japan

[21] Appl. No.: 719,391

[22] Filed: Apr. 2, 1985

[30] Foreign Application Priority Data

| Apr. 2, 1984 | [JP] | Japan | 59-63402 |
| Apr. 2, 1984 | [JP] | Japan | 59-63406 |
| May 22, 1984 | [JP] | Japan | 59-101778 |
| May 22, 1984 | [JP] | Japan | 59-101779 |

[51] Int. Cl.$^4$ .................. E21B 43/00; C08L 1/26
[52] U.S. Cl. ..................... 252/8.551; 252/315.3; 536/88; 536/96
[58] Field of Search ............ 252/8.5 A, 8.5 C, 8.55 R, 252/8.55 D, 315.3; 536/88, 96

[56] References Cited

U.S. PATENT DOCUMENTS

| 3,852,201 | 12/1974 | Jackson | 252/8.5 |
| 4,317,759 | 3/1982 | Kanda et al. | 524/93 |
| 4,330,414 | 5/1982 | Hoover | 252/8.5 |
| 4,359,392 | 11/1982 | Rygg | 536/88 X |
| 4,392,964 | 7/1983 | House et al. | 252/8.5 |

FOREIGN PATENT DOCUMENTS 49-27659 7/1974 Japan .................. 524/83

*Primary Examiner*—Herbert B. Guynn
*Attorney, Agent, or Firm*—Sughrue, Mion, Zinn, Macpeak & Seas

[57] ABSTRACT

A completion and workover fluid is described, containing a soluble salt, a hydroxyethyl cellulose and at least one compound selected from 2-mercaptobenzimidazole compounds, 2-mercaptobenzothiazole compounds, 2-mercaptothiazoline and 2-thioimidazolidone.

4 Claims, No Drawings

COMPLETION AND WORKOVER FLUIDS

FIELD OF THE INVENTION

This invention relates to completion and workover fluids. More particularly, this invention relates to improved completion and workover fluids which enable sand or other deposits in the bottom of a well to be smoothly cleaned up to the ground surface by the prevention of a lowering of their rheological properties under high temperature conditions.

BACKGROUND OF THE INVENTION

Progress in drilling techniques in recent years has been remarkable, and the developments of improved techniques for controlling drilling fluids applied to subterranean formations has permitted maintaining a high specific gravity under high temperature conditions. Thus, it becomes possible to drill deeper rock formations smoothly.

After completion of an well, oil production can be carried out, but formation damages as described below often occur. More particularly, if drilling mud and solution filtrated from a cement slurry penetrate into reservoirs which contain clay, the clay is swollen and pluggs pores to result in a lowering of permeability; or, when reservoirs of sandstone have not been fully concreted, sand flows into the well with the oil and gas, thus decreasing the productive capacity. As countermeasures to resolve such damages, various workovers can be carried out. In these cases the use of a clear brine as completion and workover fluids, without solids such as bentonite and barite, have been recommended. That is, the clear brines heretofore in use typically contain soluble salts used in an amount sufficient to obtain a desired specific gravity, hydroxyethyl cellulose as viscosifier, which is not substantially affected by the soluble salts, and if desired, various additional materials.

However, the temperature in the well tends to rise as the well becomes deeper, and a lowering of rheological properties of the completion and workover fluids results in the problem that the completion and workover fluids can not fully display their capacity for cleaning the sand or other deposits in the well up to the ground surface. Thus, it has been found that the necessary working time becomes extended and the resulting sand or other deposits can not be completely cleaned out.

Accordingly, only when a method that is able to prevent a lowering of rheological properties of completion and workover fluids heretofore in use can be found, it become possible to fully enjoy the beneficial properties of such fluids.

SUMMARY OF THE INVENTION

Based on extensive investigations, it has now been found that completion and workover fluids which do not undergo adverse lowering of rheological properties as described above can be prepared by the incorporation of certain compounds.

More particularly, the present invention is directed to a completion and workover fluid containing at least one soluble salt selected from the group consisting of calcium chloride, calcium bromide and zinc bromide, a hydroxyethyl cellulose, and at least one compound selected from the group consisting of 2-mercaptobenzimidazole compounds, 2-mercaptobenzothiazole compounds, 2-mercaptothiazoline and 2-thioimidazolidone and its object is to resolve the problems described above.

As will be seen from the examples described below, the completion and workover fluids of the present invention are superior to conventional clear brines, in that lowering of the rheological properties according to the present invention is remarkably small, and thus it is possible to fully enjoy their beneficial properties.

DETAILED DESCRIPTION OF THE INVENTION

The completion and workover fluids of the present invention contain a soluble salt, a hydroxyethyl cellulose and at least one compound selected from 2-mercaptobenzimidazole compounds, 2-mercaptobenzothiazole compounds, 2-mercaptothiazoline and 2-thioimidazolidone.

Of the selected compounds that can be contained in the completion and workover fluids of the present invention, preferred 2-mercaptobenzimidazole compounds are represented by the formula (I)

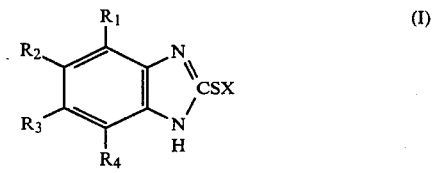

wherein each of $R_1$, $R_2$, $R_3$, and $R_4$ represents a hydrogen atom or a lower alkyl group, specifically, a methyl or ethyl group, and X represents a hydrogen atom, an alkali metal or ammonium. Of these compounds, 2-mercaptobenzimidazole (wherein $R_1$ through $R_4$=H and X=H), methyl-2-mercaptobenzimidazoles (wherein at least one of $R_1$ through $R_4$ is a methyl group, and X=H) and these sodium salts (X=Na) are preferred.

Further preferred 2-mercaptobenzothiazole compounds that can be contained in the clear brine completion and workover fluid of the present invention are represented by the formula (II)

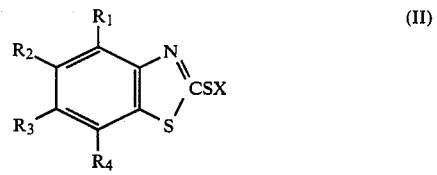

wherein each of $R_1$, $R_2$, $R_3$, and $R_4$ represents a hydrogen atom or a lower alkyl group, specifically, methyl or ethyl group, and X represents a hydrogen atom, an alkali metal or ammonium. Of these compounds, 2-mercaptobenzothiazole (wherein $R_1$ through $R_4$=H, and X=H), methyl-2-mercaptobenzothiazoles (wherein at least one of $R_1$ through $R_4$ is a methyl group, and X=H) and these sodium salts (X=Na) are preferred.

The concentration of the at least one compound selected from 2-mercaptobenzimidazole compounds, 2-mercaptobenzothiazole compounds, 2-mercaptothiazoline and 2-thioimidazolidone contained in the completion and workover fluids of the present invention is preferably in the range of from about 0.001% to about 0.2% by weight, and more preferably from about 0.005% to about 0.1% by weight, based on the total weight of the fluid.

Other components and their amounts contained in the clear brine completion and workover fluids heretofore in use, which are the objects of intended improvements according to the present invention, are as follows. The hydroxyethyl cellulose has a mean molar substitution of 1.5 or more, and a viscosity of 2,000 cp or more at 1% by weight (Brookfield Viscometer, No. 3 Spindle, 30 RPM, 25° C.), and its concentration in said fluids is in the range of about 0.2% to about 2% by weight. Also, the soluble salt is at least one selected from calcium chloride, calcium bromide, and zinc bromide, and its sort and concentration can be determined in consideration of a specific gravity required (pH of 1.01 or more, preferably 1.16 to 2.30), working temperature and crystallized temperature. The concentration of the soluble salt in said fluids is generally in the range of about 0.001% to about 70% by weight. Furthermore, as other components, defoamers, anticorrosives, pH control agents, fillers, and suspension agents can be employed.

A completion and workover fluid of the present invention can be stored at a high temperature of about 80° C. or more, preferably at about 80° to about 150° C., and their rheological properties, i.e., their apparent viscosities (AV), plastic viscosities (PV) and yield points (YP) are high as compared with those of the fluids heretofore in use. They are superior on their capacities of cleaning the sand or other deposits in the well up to the surface of the ground.

The present invention is described below by means of the examples. However, since the reproducibilities of workovers in real well are difficult, the completion and workover fluids were stored in a Roller Oven at a high temperature and their rheological properties above were measured using a Fann VG meter Model 35 (at 30° C.). The completion and workover fluids of the present inventions were compared with those heretofore in use.

In the examples below all expressions of "parts" are parts by weight, unless otherwise indicated.

EXAMPLE 1

A completion and workover fluid of the type heretofore in use was composed of 35 parts of calcium chloride, 0.8 parts of hydroxyethyl cellulose having a mean substitution mole number of 2.0 and having a viscosity of 5,000 cp at 1% by weight (Brookfield Viscometer, No. 4 Spindle, 30 RPM, 25° C.), 0.05 parts of magnesium oxide, and 65 parts of water, and the completion and workover fluid of the present invention was prepared by an addition of 0.02 parts of 2-mercaptobenzimidazole to the above fluid. Each of them was stored in a Roller Oven for 16 hours at 120° C., and then their rheological properties are measured. The results obtained are shown in Table 1.

TABLE 1

| Completion and Workover Fluid | Specific Gravity | AV (cp) | PV (cp) | YP (lb/100 ft²) |
|---|---|---|---|---|
| Fluid heretofore in use | 1.35 | 33 | 30 | 40 |
| Fluid of the present invention | 1.35 | 138 | 70 | 135 |

EXAMPLE 2

A completion and workover fluid of the type heretofore in use was composed of 35 parts of calcium chloride, 0.6 parts of hydroxyethyl cellulose, which was the same as that used in Example 1, 0.05 parts of magnesium oxide, and 65 parts of water, and the completion and workover fluid of the present invention was prepared by an addition of 0.03 parts of sodium salt of 2-mercaptobenzimidazole to the above fluid. Each of them was stored in a Roller Oven for 3 days at 100° C. Their rheological properties were measured. The results obtained are shown in Table 2.

TABLE 2

| Completion and Workover Fluid | Specific Gravity | AV (cp) | PV (cp) | YP (lb/100 ft²) |
|---|---|---|---|---|
| Fluid heretofore in use | 1.35 | 19 | 17 | 30 |
| Fluid of the present invention | 1.35 | 76 | 49 | 54 |

EXAMPLE 3

A completion and workover fluid of the type heretofore in use was composed of 35 parts of calcium chloride, 0.2 parts of hydroxyethyl cellulose, which was the same as that used in Example 1, 0.05 parts of magnesium oxide, and 65 parts of water, and the completion and workover fluid of the present invention was prepared by an addition of 0.005 parts of 2-mercaptobenzimidazole to the above fluid. Each of them was stored in a Roller Oven for 16 hours at 120° C. Their rheological properties were measured. The results obtained are shown in Table 3.

TABLE 3

| Completion and Workover Fluid | Specific Gravity | AV (cp) | PV (cp) | YP (lb/100 ft²) |
|---|---|---|---|---|
| Fluid heretofore in use | 1.35 | 7 | 7 | 0 |
| Fluid of the present invention | 1.35 | 20 | 18 | 4 |

EXAMPLE 4

A completion and workover fluid of the type heretofore in use was composed of 35 parts of calcium chloride, 0.8 parts of hydroxyethyl cellulose, which was the same as that used in Example 1, 0.05 parts of magnesium oxide, and 65 parts of water, and the completion and workover fluid of the present invention was prepared by an addition of 0.08 parts of sodium salt of methyl-2-mercaptobenzimidazole ($R_1$ through $R_4=CH_3$, $X=Na$) to the above fluid. Each of them was stored in a Roller Oven for 16 hours at 150° C. Their rheological properties were measured. The results obtained are shown in Table 4.

TABLE 4

| Completion and Workover Fluid | Specific Gravity | AV (cp) | PV (cp) | YP (lb/100 ft²) |
|---|---|---|---|---|
| Fluid heretofore in use | 1.35 | 12.5 | 13 | 1 |
| Fluid of the present invention | 1.35 | 36 | 33 | 5 |

EXAMPLE 5

A completion and workover fluid of the type heretofore in use was composed of 27.5 parts of calcium chloride, 27.2 parts of calcium bromide, 0.3 parts of hydroxyethyl cellulose, which was the same as that used in Example 1, 0.08 parts of magnesium oxide and 45.3 parts of water, and the completion and workover fluid of the present invention was prepared by an addition of 0.01 parts of sodium salt of 2-mercaptobenzimidazole to the above fluid. Each of them was stored in a Roller Oven for 16 hours at 120° C. Their rheological properties were measured. The results obtained are shown in Table 5.

TABLE 5

| Completion and Workover Fluid | Specific Gravity | AV (cp) | PV (cp) | YP (lb/100 ft$^2$) |
|---|---|---|---|---|
| Fluid heretofore in use | 1.60 | 63 | 36 | 54 |
| Fluid of the present invention | 1.60 | 101 | 60 | 82 |

EXAMPLE 6

A completion and workover fluid of the type heretofore in use was composed of 35 parts of calcium chloride, 0.8 parts of hydroxyethyl cellulose, which was the same as that used in Example 1, 0.05 parts of magnesium oxide, and 65 parts of water, and the completion and workover fluid of the present invention was prepared by an addition of 0.02 parts of 2-mercaptothiazoline to the above fluid. Each of them was stored in a Roller Oven for 16 hours at 120° C. Their rheological properties were measured. The results obtained are shown in Table 6.

TABLE 6

| Completion and Workover Fluid | Specific Gravity | AV (cp) | PV (cp) | YP (lb/100 ft$^2$) |
|---|---|---|---|---|
| Fluid heretofore in use | 1.35 | 33 | 30 | 4 |
| Fluid of the present invention | 1.35 | 134 | 67 | 135 |

EXAMPLE 7

A completion and workover fluid of the type heretofore in use was composed of 35 parts of calcium chloride, 0.6 parts of hydroxyethyl cellulose, which was the same as that used in Example 1, 0.05 parts of magnesium oxide, and 65 parts of water, and the completion and workover fluid of the present invention was prepared by an addition of 0.03 parts of 2-mercaptothiazoline to the above fluid. Each of them was stored in a Roller Oven for 3 days at 100° C. Their rheological properties were measured. The results obtained are shown in Table 7.

TABLE 7

| Completion and Workover Fluid | Specific Gravity | AV (cp) | PV (cp) | YP (lb/100 ft$^2$) |
|---|---|---|---|---|
| Fluid heretofore in use | 1.35 | 19 | 17 | 3 |
| Fluid of the present invention | 1.35 | 74 | 47 | 55 |

EXAMPLE 8

A completion and workover fluid of the type heretofore in use was composed of 35 parts of calcium chloride, 0.2 parts of hydroxyethyl cellulose, which was the same as that used in Example 1, 0.05 parts of magnesium oxide and 65 parts of water, and the completion and workover fluid of the present invention was prepared by an addition of 0.005 parts of 2-mercaptothiazoline to the above fluid. Each of them was stored in a Roller Oven for 16 hours at 120° C. Their rheological properties were measured. The results obtained are shown in Table 8.

TABLE 8

| Completion and Workover Fluid | Specific Gravity | AV (cp) | PV (cp) | YP (lb/100 ft$^2$) |
|---|---|---|---|---|
| Fluid heretofore in use | 1.35 | 7 | 7 | 0 |
| Fluid of the present invention | 1.35 | 22 | 20 | 4 |

EXAMPLE 9

A completion and workover fluid of the type heretofore in use was composed of 35 parts of calcium chloride, 0.8 parts of hydroxyethyl cellulose which was the same as that used in Example 1, 0.05 parts of magnesium oxide, and 65 parts of water, and the completion and workover fluid of the present invention was prepared by an addition of 0.08 parts of 2-mercaptothiazoline to the above fluid. Each of them was stored in a Roller Oven for 16 hours at 150° C. Their rheological properties were measured. The results obtained are shown in Table 9.

TABLE 9

| Completion and Workover Fluid | Specific Gravity | AV (cp) | PV (cp) | YP (lb/100 ft$^2$) |
|---|---|---|---|---|
| Fluid heretofore in use | 1.35 | 12.5 | 13 | 1 |
| Fluid of the present invention | 1.35 | 32 | 33 | 5 |

EXAMPLE 10

A completion and workover fluid of the type heretofore in use was composed of 27.5 parts of calcium chloride, 27.2 parts of calcium bromide, 0.3 parts of hydroxyethyl cellulose, which was the same as that used in Example 1, 0.08 parts of magnesium oxide, and 45.3 parts of water, and the completion and workover fluid of the present invention was prepared by an addition of 0.01 parts of 2-mercaptothiazoline to the above fluid. Each of them was stored in a Roller Oven for 16 hours at 120° C. Their rheological properties were measured. The results obtained are shown in Table 10.

TABLE 10

| Completion and Workover Fluid | Specific Gravity | AV (cp) | PV (cp) | YP (lb/100 ft$^2$) |
|---|---|---|---|---|
| Fluid heretofore in use | 1.60 | 63 | 36 | 54 |
| Fluid of the present invention | 1.60 | 103 | 59 | 88 |

EXAMPLE 11

A completion and workover fluid of the type heretofore in use was composed of 35 parts of calcium chloride, 0.45 parts of hydroxyethyl cellulose, which was the same as that used in Example 1, 0.04 parts of magnesium oxide, and 65 parts of water, and the completion and workover fluid of the present invention was prepared by an addition of 0.03 parts of 2-thioimidazolidone to the above fluid. Each of them was stored in a Roller Oven for 16 hours at 130° C. Their rheological properties were measured. The results obtained are shown in Table 11.

TABLE 11

| Completion and Workover Fluid | Specific Gravity | AV (cp) | PV (cp) | YP (lb/100 ft$^2$) |
| --- | --- | --- | --- | --- |
| Fluid heretofore in use | 1.35 | 12 | 12 | 0 |
| Fluid of the present invention | 1.35 | 69 | 43 | 46 |

EXAMPLE 12

A completion and workover fluid of the type heretofore in use was composed of 35 parts of calcium chloride, 0.59 parts of hydroxyethyl cellulose, which was the same as that used in Example 1, 0.04 parts of magnesium oxide, and 65 parts of water, and the completion and wokover fluid of the present invention was prepared by an addition of 0.02 parts of 2-thioimidazolidone to the above fluid. Each of them was stored in a Roller Oven for 16 hours at 120° C. Their rheological properties were measured. The results obtained are shown in Table 12.

TABLE 12

| Completion and Workover Fluid | Specific Gravity | AV (cp) | PV (cp) | YP (lb/100 ft$^2$) |
| --- | --- | --- | --- | --- |
| Fluid heretofore in use | 1.35 | 25 | 22 | 3 |
| Fluid of the present invention | 1.35 | 120 | 66 | 116 |

EXAMPLE 13

A completion and workover fluid of the type heretofore in use was composed of 35 parts of calcium chloride, 0.15 parts of hydroxyethyl cellulose, which was the same as that used in Example 1, 0.04 parts of magnesium oxide, and 65 parts of water, and the completion and workover fluid of the present invention was prepared by an addition of 0.06 parts of 2-thioimidazolidone to the above fluid. Each of them was stored in a Roller Oven for 24 hours at 120° C. Their rheological properties were measured. The results obtained are shown in Table 13.

TABLE 13

| Completion and Workover Fluid | Specific Gravity | AV (cp) | PV (cp) | YP (lb/100 ft$^2$) |
| --- | --- | --- | --- | --- |
| Fluid heretofore in use | 1.35 | 6 | 5 | 0 |
| Fluid of the present invention | 1.35 | 23 | 18 | 6 |

EXAMPLE 14

A completion and workover fluid of the type heretofore in use was composed of 35 parts of calcium chloride, 0.45 parts of hydroxyethyl cellulose, which was the same as that used in Example 1, 0.04 parts of magnesium oxide, and 65 parts of water, and the completion and workover fluid of the present invention was prepared by an addition of 0.08 parts of 2-thioimidazolidone to the above fluid. Each of them was stored in a Roller Oven for 16 hours at 140° C. Their rheological properties were measured. The results obtained are shown in Table 14.

TABLE 14

| Completion and Workover Fluid | Specific Gravity | AV (cp) | PV (cp) | YP (lb/100 ft$^2$) |
| --- | --- | --- | --- | --- |
| Fluid heretofore in use | 1.35 | 7 | 7 | 0 |
| Fluid of the present invention | 1.35 | 30 | 29 | 6 |

EXAMPLE 15

A completion and workover fluid of the type heretofore in use was composed of 27.5 parts of calcium chloride, 27.2 parts of calcium bromide, 0.38 parts of hydroxyethyl cellulose, which was the same as that used in Example 1, 0.04 parts of magnesium oxide, and 45.3 parts of water, and the completion and workover fluid of the present invention was prepared by an addition of 0.01 parts of 2-thioimidazolidone to the above fluid. Each of them was stored in a Roller Oven for 16 hours at 110° C. Their rheological properties were measured. The results obtained are shown in Table 15.

TABLE 15

| Completion and Workover Fluid | Specific Gravity | AV (cp) | PV (cp) | YP (lb/100 ft$^2$) |
| --- | --- | --- | --- | --- |
| Fluid heretofore in use | 1.60 | 19 | 18 | 1 |
| Fluid of the present invention | 1.60 | 88 | 46 | 86 |

EXAMPLE 16

A completion and workover fluid of the type heretofore in use was composed of 35 parts of calcium chloride, 0.45 parts of hydroxyethyl cellulose, which was the same as that used in Example 1, 0.04 parts of magnesium oxide, and 65 parts of water, and the completion and workover fluid of the present invention was prepared by an addition of 0.03 parts of 2-mercaptobenzothiazole to the above fluid. Each of them was stored in a Roller Oven for 16 hours at 130° C. Their rheological properties were measured. The results obtained are shown in Table 16.

TABLE 16

| Completion and Workover Fluid | Specific Gravity | AV (cp) | PV (cp) | YP (lb/100 ft$^2$) |
| --- | --- | --- | --- | --- |
| Fluid heretofore in use | 1.35 | 12 | 12 | 0 |
| Fluid of the present invention | 1.35 | 70 | 46 | 48 |

EXAMPLE 17

A completion and workover fluid of the type heretofore in use was composed of 35 parts of calcium chloride, 0.59 parts of hydroxyethyl cellulose, which was the same as that used in Example 1, 0.04 parts of magnesium oxide, and 65 parts of water, and the completion and workover fluid of the present invention was prepared by an addition of 0.02 parts of sodium salt of 2-mercaptobenzothiazole to the above fluid. Each of them was stored in a Roller Oven for 16 hours at 120° C. Their rheological properties were measured. The results obtained are shown in Table 17.

TABLE 17

| Completion and Workover fluid | Specific Gravity | AV (cp) | PV (cp) | YP (lb/100 ft²) |
| --- | --- | --- | --- | --- |
| Fluid heretofore in use | 1.35 | 25 | 22 | 3 |
| Fluid of the present invention | 1.35 | 129 | 68 | 125 |

EXAMPLE 18

A completion and workover fluid of tye type heretofore in use was composed of 35 parts of calcium chloride, 0.15 parts of hydroxyethyl cellulose, which was the same as that used in Example 1, 0.04 parts of magnesium oxide, and 65 parts of water, and the completion and workover fluid of the present invention was prepared by an addition of 0.006 parts of 2-mercaptobenzothiazole to the above fluid. Each of them was stored in a Roller Oven for 24 hours at 120° C. Their rheological peroperties were measured. The results obtained are shown in Table 18.

TABLE 18

| Completion and Workover Fluid | Specific Gravity | AV (cp) | PV (cp) | YP (lb/100 ft²) |
| --- | --- | --- | --- | --- |
| Fluid heretofore in use | 1.35 | 6 | 5 | 0 |
| Fluid of the present invention | 1.35 | 22 | 19 | 5 |

EXAMPLE 19

A completion and workover fluid of the type heretofore in use was composed of 35 parts of calcium chloride, 0.450 parts of hydroxyethyl cellulose, which was the same as that used in Example 1, 0.04 parts of magnesium oxide, and 65 parts of water, and the completion and workover fluid of the present invention was prepared by an addition of 0.08 parts of sodium salt of methyl-2-mercaptobenzothiazole to the above fluid. Each of them was stored in a Roller Oven for 16 hours at 140° C. Their rheological properties were measured. The results obtained are shown in Table 19.

TABLE 19

| Completion and Workover Fluid | Specific Gravity | AV (cp) | PV (cp) | YP (lb/100 ft²) |
| --- | --- | --- | --- | --- |
| Fluid heretofore in use | 1.35 | 7 | 7 | 0 |
| Fluid of the present invention | 1.35 | 33 | 30 | 5 |

EXAMPLE 20

A completion and workover fluid of the type heretofore in use was composed of 27.5 parts of calcium chloride, 27.2 parts of calcium bromide, 0.38 parts of hydroxyethyl cellulose, which was the same as that used in Example 1, 0.04 parts of magnesium oxide, and 45.3 parts of water, and the completion and workover fluid of the present invention was prepared by an addition of 0.01 parts of sodium salt of 2-mercaptobenzothiazole to the above fluid. Each of them was stored in a Roller Over for 16 hours at 110° C. Their rheological properties were measured. The results obtained are shown in Table 20.

TABLE 20

| Completion and Workover Fluid | Specific Gravity | AV (cp) | PV (cp) | YP (lb/100 ft²) |
| --- | --- | --- | --- | --- |
| Fluid heretofore in use | 1.60 | 19 | 18 | 1 |
| Fluid of the present invention | 1.60 | 89 | 45 | 88 |

As can be seen from the above Examples, it is clearly demonstrated that the clear brine completion and workover fluids of the present invention are superior to those heretofore in use on their rheological properties.

While the invention has been described in detail and with reference to specific embodiments thereof, it will be apparent to one skilled in the art that various changes and modifications can be made therein without departing from the spirit and scope thereof.

What is claimed is:

1. An aqueous completion and workover fluid containing at least one soluble salt selected from the group consisting of calcium chloride, calcium bromide and zinc bromide, a hydroxyethyl cellulose present as a viscosifier, and at least one compound selected from the group consisting of 2-mercaptobenzimidazole compounds, 2-mercaptobenzothiazole compounds, 2-mercaptothiazoline and 2-thioimidazolidone, wherein the 2-mercaptobenzimidazole compounds are represented by the formula (I)

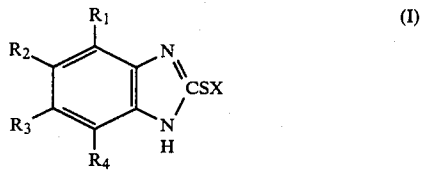

wherein each of $R_1$, $R_2$, $R_3$, and $R_4$ represents a hydrogen atom or a lower alkyl group, and X represents a hydrogen atom, an alkali metal, or ammonium, and the 2-mercaptobenzothiazole compounds are represented by the formula (II)

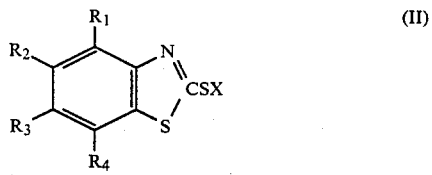

wherein each of $R_1$, $R_2$, $R_3$, and $R_4$ represents a hydrogen atom or a lower alkyl group, and X represents a hydrogen atom, an alkali metal, or ammonium, and the concentration of said compounds contained in the fluid is from about 0.001% to about 0.2% by weight, based on the total weight of the fluid.

2. An aqueous completion and workover fluid as in claim 1, wherein each of $R_1$, $R_2$, $R_3$, and $R_4$ represents a hydrogen atom or a methyl group and X represents a hydrogen atom or sodium.

3. An aqueous completion and workover fluid as in claim 1, wherein each of $R_1$, $R_2$, $R_3$, and $R_4$ represents a hydrogen atom or a methyl group and X represents a hydrogen atom or sodium.

4. An aqueous completion and workover fluid as in claim 1, wherein the concentration of said compounds contained in the fluid is from about 0.005% to about 0.1% by weight, based on the total weight of the fluid.

* * * * *